Aug. 6, 1963

Q. A. KERNS 3,100,284

PULSE SYNTHESIZING GENERATOR

Filed Aug. 31, 1960

INVENTOR.
QUENTIN A. KERNS
BY
Roland A. Anderson
ATTORNEY.

Aug. 6, 1963 Q. A. KERNS 3,100,284
PULSE SYNTHESIZING GENERATOR
Filed Aug. 31, 1960 2 Sheets-Sheet 2

INVENTOR.
QUENTIN A. KERNS
BY
Roland A. Anderson
ATTORNEY.

United States Patent Office 3,100,284
Patented Aug. 6, 1963

3,100,284
PULSE SYNTHESIZING GENERATOR
Quentin A. Kerns, Orinda, Calif., assignor to the United States of America as represented by the United States Atomic Energy Commission
Filed Aug. 31, 1960, Ser. No. 53,320
5 Claims. (Cl. 331—55)

The present invention relates generally to electronic pulse circuitry and more particularly to a pulse generator particularly useful for synthesizing pulses having extremely fast rise times.

In pulse circuit design, a continuing effort has been made to produce faster pulses with very rapid rise times. Such pulses are exemplified by both square waveform pulses and by step waveform pulses wherein it is the objective to change from one energy level to another energy level as rapidly as possible. For example, clock pulses in advanced high speed computers must be extremely precise with regard to rise time, it being preferred that the rise time approach zero as nearly as possible. The output of the generator may be further utilized for testing the propagation characteristics of a medium such as the atmosphere, a particular waveshape being synthesized and transmitted, the received resultant then being analyzed to determine the effect of the transmitting medium. The generator is also useful for synthesizing very short impulses for such purposes as momentarily turning on the beam of a sampling oscilloscope.

The standard techniques for providing a step pulse with short rise time utilize rapid switching by electronic or mechanical means, but the minimum rise time obtained is limited by unavoidable stray inductance and capacitance in the circuitry to values of $10^{-9}$ to $10^{-10}$ seconds. A further inherent difficulty is in the time dispersion caused by the transmission line from such a pulse generator to the pulse receiving apparatus. A pulse of acceptably low rise time at the pulse generator may be distorted by the transmission line into a pulse having an unacceptably long rise time. It is not the transmission line delay in itself that is undesirable, but the unequal delay of different frequencies that distorts the waveform.

The present invention provides a novel system for synthesizing a fast rise pulse from sine wave signals of slower rise time. By means of the invention the fast rise pulse can be remotely synthesized at a region adjacent the pulse utilization apparatus, thereby overcoming the problems of transmission line delay distortion.

The pulse synthesis in the present invention may be understood by considering the Fourier analysis of a periodic square wave function defined by $y=f(x)$ where $f(x)$ has a finite number of maxima and minima within the interval $-\eta \leq x \leq \pi$. For a square wave the Fourier series is $f(x)=4/\eta$ [sin $x+\frac{1}{3}$ sin $3x+\frac{1}{5}$ sin $5x$ . . . ]. Each term in the series may be represented by a sine wave signal having appropriate frequency, amplitude and phase. The various signals are combined to synthesize the desired square wave. When the number of terms in the series is increased the approximating curve approaches the defining condition as a limit, that is, a more nearly "perfect" square wave is obtained. Other waveforms may be synthesized by other combinations of sine waves in accordance with corresponding Fourier series.

It will be noted from the above equation that the resultant square wave is composed of a series of odd harmonic sine waves. The invention utilizes a plurality of sine wave oscillators each producing one of the harmonic frequencies which are combined by means of novel circuitry to produce an output wave having the desired shape. The number of oscillators used will depend upon the accuracy with which the synthesized signal should reproduce the theoretically perfect signal. Thus in some instances where only an approximation of a square wave is required, as few as three oscillators may provide a satisfactory synthesis while in other instances twenty, fifty or a hundred oscillators may be required to provide a more precise approximation.

One important consideration in designing suitable circuitry for the generator is that the relative phase of the oscillators must be closely controlled in order to provide satisfactory results. The oscillators may contain phase control means for continuous operation or, at higher frequencies, the phase control may be obtained by triggering all oscillators on simultaneously. In the latter system, the phase of signals from each oscillator is for a limited time directly related to the triggering time of the oscillator. That is, after each triggering of an oscillator, the phase of signals therefrom are repeatable for a period until drift occurs. However, such period is sufficiently long for many cycles of the output signal to be produced in a chosen phase relationship with other oscillators similarly triggered. The oscillators may be turned off and retriggered periodically to correct for phase drift.

Each oscillator has an individual phase shifting control so that the phase relative to the other oscillators can be varied. Therefore, the synthesized output pulse can be provided at a remote utilization point even if the characteristics of the transmission system delay certain frequencies more than others. The phase of a signal from an oscillator producing a frequency which is delayed in the transmission line is advanced to compensate for the delay and the signal arrives at the terminus in the correct phase relationship with signals from the other oscillators.

It is an object of this invention to provide a pulse generator capable of very accurately synthesizing electrical pulses of a desired wave shape from the Fourier components thereof.

It is another object of this invention to provide apparatus for generating electrical pulses having extremely rapid rise times.

It is an object of the invention to provide a pulse generating circuit capable of synthesizing accurate fast rise time pulses from sine wave signals of slower rise time.

It is a further object of the invention to provide a generator producing pulses having extremely fast rise times and having provision whereby phase distortion of said pulses in an output transmission line is effectively eliminated.

It is still another object of the invention to provide a pulse generator capable of producing pulses having rise times of less than $10^{-10}$ seconds.

The invention, both as to its organization and method of operation together with further objects and advantages thereof, will be better understood by reference to the following specification taken in conjunction with the accompanying drawing, in which.

Figure 1:
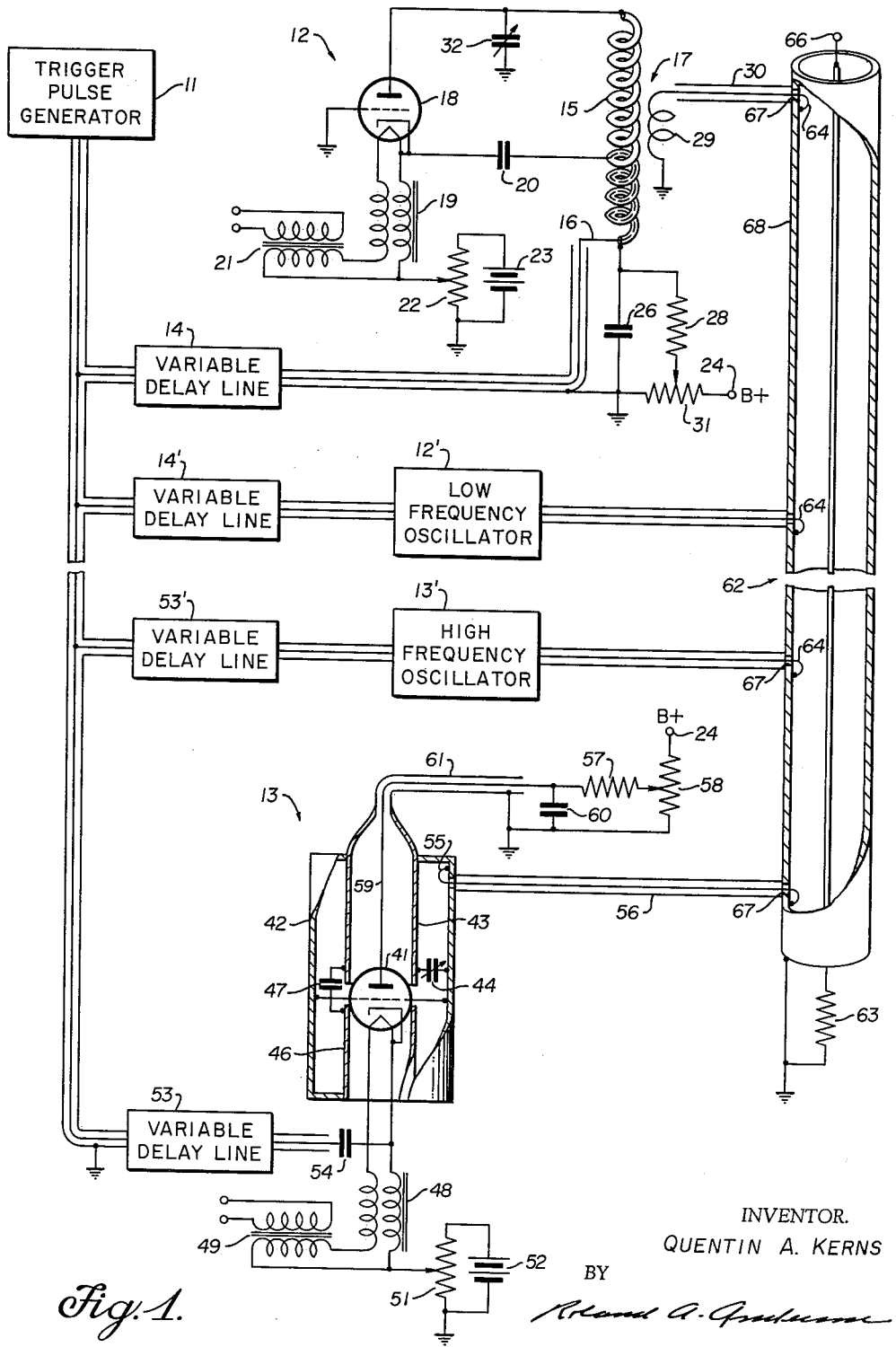
FIGURE 1 is a circuit diagram of a first embodiment of the invention.

Referring now to the drawing, there is shown a trigger pulse generator 11 of conventional design which supplies a negative pulse for initiating oscillation in a plurality of oscillators. The number of oscillators employed may be varied according to the rise time which is to be produced, a greater number of oscillators providing a more rapid rise time. In the drawing, two pulsed oscillators are shown; a low frequency oscillator 12 and a high frequency oscillator 13, the former typifying a generator for the first term in a Fourier series and the latter typifying a generator for a higher term in the Fourier series. Additional oscillators indicated by blocks 12' and 13' provide the intermediate terms.

It is important in this invention that the start of oscillation in the plurality of oscillators be commenced with precise timing. That is, the usual method of starting an oscillator by relying on thermal tube noise or the like to initiate the oscillation will, in this invention, provide too indefinite a starting time. Each oscillator must start oscillation at a definite time relative to the start of the other oscillators. Such synchronization is essential to initiate the necessary phase relationships between the oscillator outputs. In the low frequency oscillator 12, pulses of negative polarity from the trigger pulse generator 11 are coupled through an adjustable delay line 14 to a feedback winding 16 of a coaxial transformer 17. An anode coil 15 is the outer shield conductor of the coaxial transformer 17, the feedback winding 16 being the inner conductor for a portion of the length of the transformer. A triode oscillator tube 18 has a grounded control electrode with triggering and positive feedback excitation being applied to the cathode. The cathode of the tube 18 is connected to the filament which is isolated from power supply circuitry at high frequencies by a filament choke 19 in each filament conductor. A coupling capacitor 20 is connected from the feedback winding 16 to the cathode and filament to prevent direct current voltages at the cathode from appearing on the feedback windings.

A filament transformer 21 converts the power line alternating current potentials to a low voltage suitable for exciting the filament of the low frequency oscillator tube 18. The filament transformer 21 is isolated at high frequencies from the filament of the tube 18 by the filament chokes 19 while the filament transformer 21 provides direct current isolation of the cathode from the power line.

The oscillator tube 18 is normally maintained in a nonconductive state by holding the filament and cathode at a positive potential relative to the grounded grid. Such positive potential is applied to the filament through the filament chokes 19 from a bias potential source comprised of a potentiometer 22 connected across a bias potential source such as a battery 23. The movable slider of the potentiometer 22 is connected to the filament winding of the transformer 21.

The anode of the low frequency oscillator tube 18 is connected through an anode coil 15 in the air core transformer 17 to a current limiting and decoupling resistor 28 connected in series from the anode coil 15 to an adjustable slider on an amplitude potentiometer 31 connected from ground to a B plus terminal 24. An output coil 29 of the coaxial transformer 17 is connected to a coaxial line 30 and provides a convenient means for removing a portion of the signals developed in the anode coil 15 for combination with other signals as will be subsequently described. A bypass capacitor 26 is connected from the juncture of the current limiting resistor 28 and the anode coil 15 to ground, effectively grounding the juncture for radio frequency potentials. A tuning capacitor 32 is connected from the anode of the oscillator tube 18 to ground, forming a frequency determining resonant circuit with the anode coil 15.

Considering now the operation of the low frequency oscillator 12, assume that operating potentials are applied, and that the positive bias applied to the cathode of oscillator tube 18 has prevented any conduction therethrough, thereby preventing the buildup of any oscillation. A negative pulse is produced in the pulse generator 11, passing through the delay line 14 and through the feedback winding 16 of the cathode of the oscillator tube 18. The lowered cathode potential decreases the cathode to grid bias and electron current flows through the tube 18 and through the anode coil 15. The feedback coil 16 is polarized with the anode coil 15 so that positive feedback occurs, the increase in current through the anode coil 15 causing a decrease in cathode potential, thereby still further increasing the anode current. Operation continues as in a standard oscillator, the amplitude of the oscillations rapidly increasing to a maximum level of oscillation, such maximum being controlled by the setting of the amplitude potentiometer 31.

It should be noted that the conduction in the oscillator is positively initiated by the input trigger pulse, thus the output signal always bears a definite and repeatable phase relationship to the input trigger pulse.

In practice there will generally be a considerable number of oscillators employed each providing an output signal for a term in the Fourier series, all of the oscillators being triggered on by a pulse from the trigger pulse generator 11 as described. The oscillators may be varied in design as necessary to operate at the progressively greater frequencies. Considering now an oscillator design suitable for generating the very high frequencies, an oscillator 13 is shown which functions in a similar manner to the low frequency oscillator 12, but with frequency determining elements of a different configuration. The low frequency oscillator 12 may operate below 50 megacycles while the high frequency oscillator 13 may operate up to 1000 megacycles. Higher frequency oscillators with suitable triggering circuitry constructed according to the pattern described here may be used to extend the frequency range as desired.

Considering now the high frequency oscillator 13 and associated components, a high frequency triode tube 14 has a tuned cavity assembly disposed therearound. Such cavity comprises an outer conductive re-entrant cylinder or channel 42 disposed about the tube 41 to form the outer wall of both an anode line and a cathode line. An anode channel 43 is disposed coaxially within the outer channel 42, the anode channel 43 being electrically connected to the outer channel 42 at one end thereof and passing centrally therethrough for approximately half the length of the outer channel 42. The anode channel 43 and the outer channel 42 together function as a coaxial line shorted at one end and having a length of less than one-quarter wave length at the operating frequency, thereby appearing inductive to signals developed at the anode of the tube 41. A variable tuning capacitor 44 is connected between the anode channel 43 and the outer channel 42 for resonating the cavity assembly to the desired operating frequency, the capacitance combining with the inductive impedance of the coaxial cavity to obtain the necessary reactance.

The outer channel 42 extends around and past the cathode end of the tube 41 and a re-entrant inner cathode channel 46 is axially aligned with the anode channel 43. The control electrode of the tube 41 is grounded to the outer channel 42 and triggering and feedback signals are coupled from the anode inner channel 43 to the cathode inner channel through a feedback capacitor 47.

The cathode circuitry for the high frequency oscillator 13 is identical to that for the low frequency oscillator 12. A filament choke 48 isolates the filament of the tube 41 from a filament power transformer 49 at high frequencies. An adjustable bias control comprised of a potentiometer 51 is connected across a potential source 52 and is set to hold the high frequency oscillator in a non-operative condition until a triggering pulse is received from the delay line 53 through a pulse coupling capacitor 54 connected between the delay line 53 and the cathode. The delay line 53 receives the trigger pulses from the trigger pulse generator 11 as do all the delay lines associated with the various oscillators. A coupling loop 55 is disposed adjacent the anode channel 43, one end of the loop being connected to the outer channel 42 while the other end extends through an aperture in the outer channel 42 and connects to the inner conductor of a coaxial line 56, such loop acting to deliver the output of oscillator 13 to the line. As in the low frequency oscillator 12, the amplitude of the output signal from the high frequency oscillator 13 is adjustable by varying the B plus potential applied to the anode of the tube 41. A current limiting and decoupling resistor 57 is connected from the movable arm of a potentiometer 58 connected between the B plus terminal 24 to ground. A line 59 passes through the center of the anode channel 43 to a coaxial cable 61 connected from the anode of the tube 41 to the resistor 57. A decoupling capacitor 60 is connected from the resistor 57 to ground for preventing high frequency signals from entering the power supply.

A transmission line 62, terminated at one end in its characteristic impedance 63, provides a means for mixing together the outputs of the oscillators and for transmitting the combined outputs to a point where the combined signals are to be utilized. The signal output lines from the individual oscillators are each coupled to the transmission line 62 through apertures 67 in the outer conductor 68 thereof. The center conductors of each of the incoming oscillator lines pass through successive ones of the apertures 67 and connect to one end of a loop 64. The other end of the loop 64 is connected to the inner surface of the outer conductor 68 of the coaxial line 62. Oscillator signals received by the loops 64 are thus inductively coupled to the coaxial line 62. The signals mix in the line 62 and the combined resultant is available at an output terminal 66.

Figure 2:
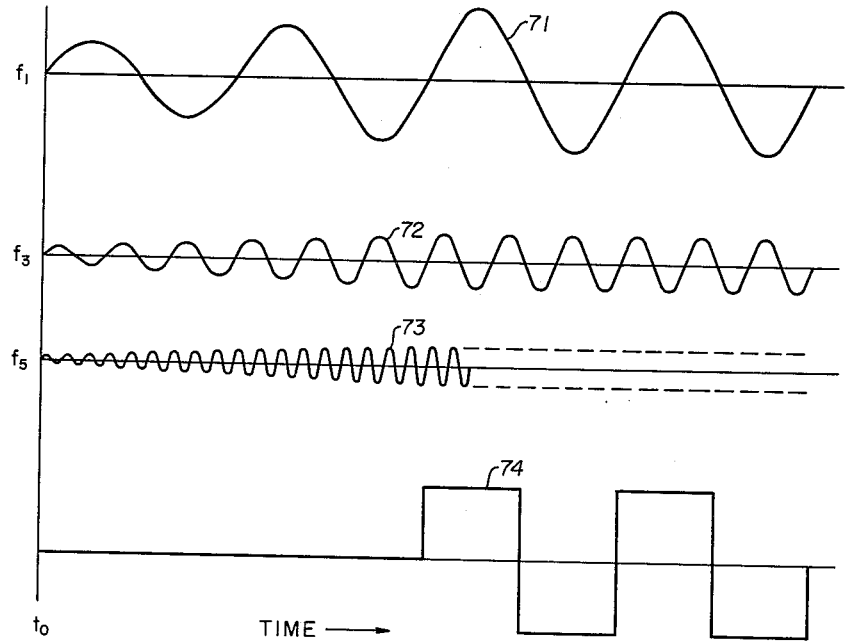
FIGURE 2 is a graphical illustration of waveforms occurring in the circuit of FIGURE 1.

Referring now to FIGURE 2, there is shown a presentation of typical waveforms in the device for the various terms of a Fourier series for a square wave. The first term is the fundamental frequency $f_1$ as typified by a sine wave signal 71. The next term is the third harmonic frequency $f_3$ indicated by a sine wave signal 72 while the third term is the fifth harmonic $f_5$ as indicated by sine wave signal 73. Many more harmonic frequencies may be included as are necessary to obtain the desired accuracy of output square waveform as indicated by a square wave 74. The three sine wave signals $f_1$, $f_3$ and $f_5$ are shown from the time when the oscillators are simultaneously triggered "on," the amplitude of the output signals from each of the oscillators building up from zero to a maximum predetermined amplitude after a few cycles. The first two cycles of the square wave 74 are not shown since distortion will be present during such short period and it may be desired to eliminate such cycles from the output by suitable gating means, depending upon the particular situation.

The relative phase of the waveforms in FIGURE 2 are shown as they would appear individually and collectively at the output terminal 66, that is, the phase delays in the circuit for the various frequencies are not indicated. If the phases of the various output signals from the oscillators were shown in relation to a trigger pulse from the pulse generator 11, it would be noted that the various oscillators must be triggered on at different times to have the signals arrive at the output terminal 66 in the proper phase relationship shown in FIGURE 2. Delay means such as the delay lines 14, 14', 53 and 53' are included so that the time at which each oscillator is turned "on" is easily controlled. It will be noted by reference to the Fourier series that each term has a distinct amplitude. Accordingly an amplitude control such as potentiometers 31 and 58 is included with each oscillator. In many instances, a particular frequency or frequencies may be attenuated relatively more than other frequencies in the transmission line 62, thus the amplitude for such frequencies is increased an appropriate amount through adjustment of the potentiometers 31 and 58.

In operation, it has been found convenient to connect an oscilloscope to the output terminal 66 and, by adjustment of the amplitude and phase control while observing the resultant scope image, obtain the proper settings by empirical means.

Figure 3:
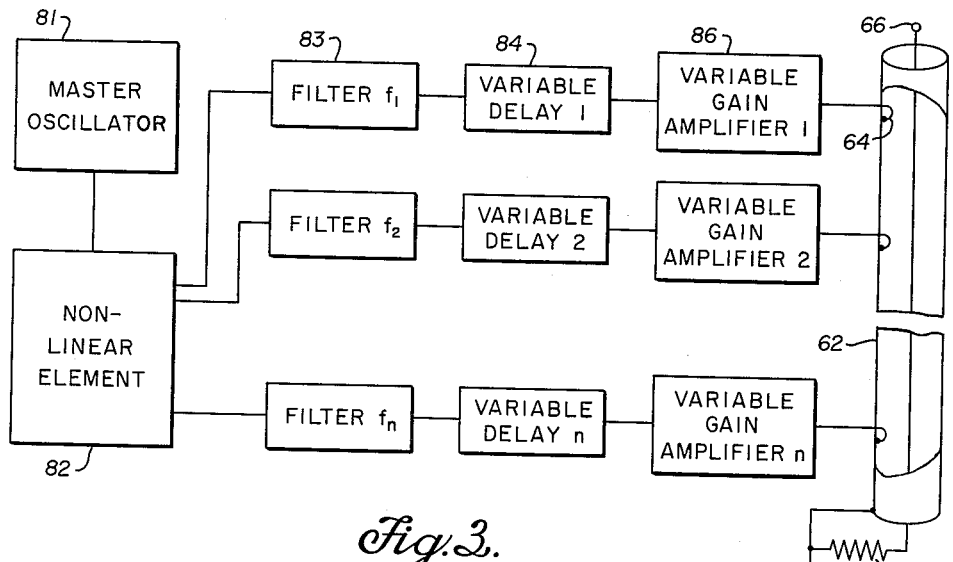
FIGURE 3 is a block diagram of a second embodiment of the invention.

Referring now to FIGURE 3, there is shown a block diagram of a second embodiment of the invention adapted for continuous operation. A master oscillator 81 operates under steady state conditions at the fundamental frequency. A non-linear element 82, such as a diode, is excited by the master oscillator 81, producing the necessary harmonic frequencies. A plurality of band pass filters 83 separate each one of the harmonics from the output of the non-linear element 82, such as a diode, is excited by the master oscillator 81, producing the necessary harmonic frequencies. A plurality of band pass filters 83 separate each one of the harmonics at the output of the non-linear element 82 from the other harmonics so that each harmonic frequency is separately available in an individual channel. Each filter 83 is tuned to a separate one of the harmonic frequencies of the master oscillator frequency. The signal from each filter is coupled through a variable delay 84 to an amplifier 86 having controllable gain. The amplified outputs from the amplifiers 86 are combined in the same manner as in the embodiment of FIGURE 1, specifically, such combining occurs in a coaxial line 62 terminated at one end by the characteristic impedance 63 and having an output terminal 66 at the other. Coupling loops 64 disposed within the line 62 each receive the output of one of the amplifiers 86.

In operation, signals at each of the various harmonic frequencies are individually selected from the output of the non-linear element 82 by the filters 83. Through adjustment of the variable delays 84 and amplifiers 86, the phase and amplitude of each selected frequency are controlled according to the particular Fourier series being synthesized. For instance, if a square wave is to be synthesized, only odd harmonics are required and the gain of the amplifiers in the even harmonic channels is set to zero. By suitable adjustments, the Fourier terms of any other waveform can be similarly provided.

Various modifications of the circuitry may be provided. For instance, the delay means might be inserted after the oscillators instead of as shown in FIGURE 1 while other amplitude control means may be provided. A physically compact synthesizer may have oscillators utilizing transistors or tunnel diodes instead of the tubes shown here.

While the invention has been disclosed with respect to a limited number of exemplary embodiments, it will be apparent to those skilled in the art that numerous variations and modifications may be made within the spirit and scope of the invention and thus it is not intended to limit the invention except as defined in the following claims.

What is claimed is:

1. In a signal generating circuit, the combination comprising a plurality of oscillators each resonant at harmonically related frequencies and each having a control electrode, an amplitude control in each of said oscillators, a phase control in each of said oscillators, a bias means selectively connectable with said control electrodes of each of said oscillators for holding said oscillators in an initially non-resonant state, a triggering means selectively connectable with said control electrodes of each of said oscillators for initiating oscillation in said oscillators with precise synchronization, and a mixer having a composite signal output terminal and having a plurality of inputs each receiving the output of a separate one of said oscillators.

2. A circuit for generating signals having a waveform equivalent to combined terms of a Fourier series comprising, in combination, a plurality of oscillators each resonant at a separate frequency corresponding to successive terms in said Fourier series and each having a control electrode, a bias voltage source connectable with said control electrodes of each of said oscillators for initially applying a cut-off potential thereto, a triggering circuit connectable with each of said control electrodes for exciting said oscillators into operation, a mixer having an output and having a plurality of inputs each receiving the output of a separate one of said oscillators, a plurality of phase controls each coupled to a separate one of said oscillators, and a plurality of amplitude controls each coupled to a separate one of said oscillators.

3. A circuit as described in claim 2, wherein said mixer is comprised of a coaxial transmission line having an inner and an outer conductor one extremity of which line comprises said output, said mixer inputs being a plurality of coupling loops disposed within said outer conductor at spaced apart points along the length thereof and each coupled to the output of one of said oscillators.

4. In a generator for producing an output waveform having a fast rise time, the combination comprising a plurality of oscillators operable at harmonically related frequencies, a vacuum tube in each of said oscillators which tube has a grounded control electrode and an anode and a cathode, a source of cut-off bias coupled to the cathode of each of said tubes, a source of controllable anode potential coupled to the anode of each of said tubes, a trigger pulse source coupled to the cathode of each of said tubes, a mixer having a plurality of inputs each coupled to a separate one of the anodes of said oscillators, and a plurality of delay circuits each controlling the phase of signals from a separate one of said oscillators.

5. A generator as described in claim 4 wherein each of said delay circuits is independently adjustable.

References Cited in the file of this patent

UNITED STATES PATENTS

| | | |
|---|---|---|
| 2,432,152 | Hanert et al. | Dec. 9, 1947 |
| 2,478,973 | Mahren | Aug. 16, 1949 |
| 2,684,467 | Young et al. | July 20, 1954 |
| 2,829,255 | Bolie | Apr. 1, 1958 |